Oct. 14, 1924.
W. P. HAMMOND
INSTRUMENT BOARD
Filed Oct. 23, 1922
1,511,989
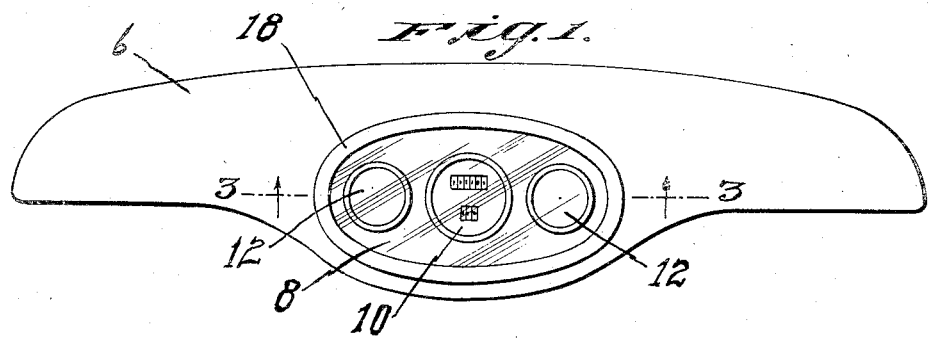
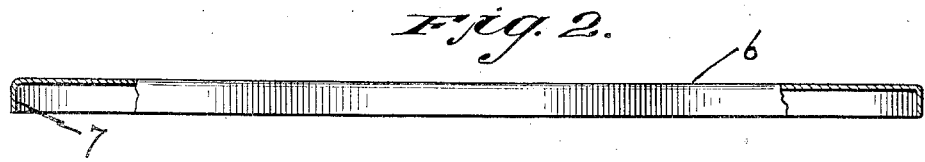
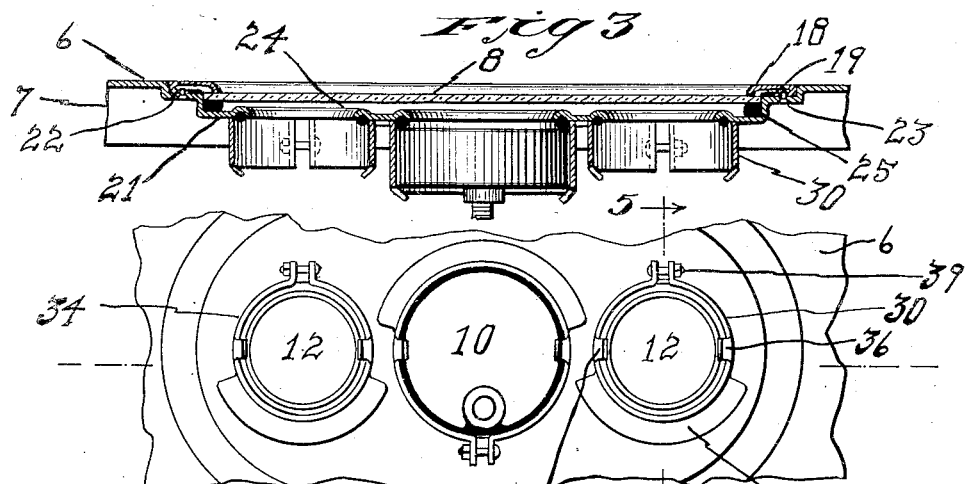
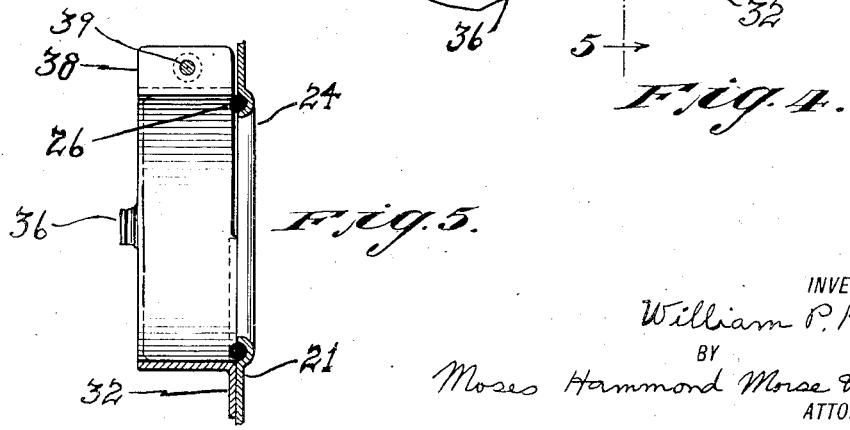
INVENTOR
William P. Hammond
BY
Moses Hammond Morse & Nolte
ATTORNEYS Patented Oct. 14, 1924.

1,511,989

UNITED STATES PATENT OFFICE.

WILLIAM P. HAMMOND, OF EAST ORANGE, NEW JERSEY.

INSTRUMENT BOARD.

Application filed October 23, 1922. Serial No. 596,202.

*To all whom it may concern:*

Be it known that I, WILLIAM P. HAMMOND, a citizen of the United States, and a resident of East Orange, county of Essex, and State of New Jersey, have invented certain new and useful Improvements in Instrument Boards, of which the following is a specification.

The present invention relates to certain new and useful improvements in motor vehicles and more particularly to an instrument board for automobiles, one object of the invention being to provide a construction for instrument boards in which all of the measuring and indicating instruments are covered by a single transparent plate, thus obviating the necessity of providing an independent crystal or glass and corresponding bezel for each individual instrument.

It is my object to accomplish this result with a minimum of parts and with a large reduction in the manual labor involved. More specifically it is my object to provide improvements in the "glass covered dashboard for automobiles" for which United States Letters Patent No. 1,296,182, was granted me March 4th, 1919, and to provide such improvements as will reduce the cost of production while increasing the beauty and usefulness of this device.

The attached drawings will serve to show, for illustrative purposes, one embodiment of my invention. In the several views of these drawings like parts are referred to, in all cases, by like numerals.

Figure 1 is an elevation of the front of an instrument board embodying my invention.

Figure 2 is an edgewise view of the instrument board shown in Figure 1 with portions thereof broken away to show the detail construction.

Figure 3 is a sectional view of a portion of the instrument board shown in Figure 1, on the line 3—3 with the instrument clamps attached thereto.

Figure 4 is a fragmentary rear view of the instrument board shown in Figure 1.

Figure 5 is a sectional view of Figure 4 on the line 5—5.

Referring to the complete instrument board shown in Figure 1, the instrument board proper is indicated at 6 while the cover glass 8 covers the instrument faces, one of which is indicated in place at 10, two further openings 12, 12 are provided for additional instruments. The cover glass 8 is held in place by the retaining ring 18 which as it comes flush with the surface of the instrument board 6, forms a continuation of such surface and a finishing moulding for the edge of the instrument recess.

As will be seen from Figure 2, the edges 7 of the instrument board are flanged inward to the rear of the board to reinforce the board and form a convenient bracket for attaching the dashboard to the automobile body. The entire instrument board is formed from a single metal sheet by pressing the sheet between properly shaped dies. These dies as they form the flange 7 also form a recessed portion, or panel 21, the walls of which are formed with a step or supplementary peripheric recess 22 to receive the glass retaining ring 18, the die operation also punches out the openings 12 and forms raised beads 24 around their edges.

Thus it will be seen that at a single operation a one piece instrument board and instrument panel has been produced. The glass retaining ring 18 is formed with an under lip 19 by a similar pressing operation in a suitably formed die. Holes are then drilled in the step or peripheric recess 22 and tapped holes in corresponding positions in the underlip 19 of the ring 18 enable machine screws 23 to hold ring 18 and the glass 8 securely in place. To protect the glass 8 from shocks, and to press it firmly against the retaining ring 18 to make a water-tight joint, a rubber or other resilient gasket 25 is supplied.

To mount the instruments behind the panel 21 with their faces in registry with the openings 12 clamping pieces 30 are formed from sheet metal with an attaching flange 32, a contracting ring 34, wedging lips 36 and the lugs 38 and bolt 39 for contracting the ring 34. The construction of this clamping piece is most plainly seen from Figure 5, which is a sectional view through this piece attached, preferably by welding the flange 32 to the rear of the instrument panel 21.

The instruments are mounted by loosening the bolt 39 until the instrument will pass between the wedging lips 36, the outside rim of the instrument face is then engaged by the rear side of the bead 24 which is provided with a resilient packing 26, when in place the bolt 39 is tightened, contracting the ring 30 and bringing the wedging lips 36 into contact with the rear edge of the instrument, further tightening of bolt 39 wedges the instrument firmly between the lips 36 and the resilient packing 26. An instrument 10 is shown mounted in the central opening of the instrument panel in Figures 1, 3 and 4.

It will be seen that by the one piece construction disclosed in this specification, it becomes possible to manufacture the entire instrument board and instrument panel complete at a single pressing operation. The instrument clamps are formed by an operation equally simple and by joining them to the instrument panel by welding or like process, machined parts are eliminated and they become integral with the instrument panel, this leaves only the cover glass, the glass retaining ring and the instruments themselves as separate parts. These parts must necessarily be separable from the instrument board for such purposes as adjusting the instrument movements or replacing the cover glass when broken by a blow.

Thus it will be seen that this invention reduces the number of separate parts to a minimum, eliminating possible loosening of parts due to vibration, and providing a strong rigid instrument board and instrument panel of considerable beauty in appearance without the use of wood or other material which deteriorates under exposure to the weather and which is not fire-proof.

It will be evident that many modifications may be made in the details of construction, as instances, the instrument panel, or the whole instrument board may be of any desired outline, the glass retaining ring may be raised and ornamented, the instrument clamping rings may be bolted, riveted, or otherwise fastened to the instrument panel, and many other modifications in construction, material and manufacture may be made without departing from the spirit of the invention or the scope of the following claims.

What I claim is:

1. The combination with an automobile instrument board of a mounting section for a plurality of instruments integral therewith and inset from the face of the board, and a transparent cover over said mounting section and spaced therefrom.

2. A new article of manufacture comprising an automobile instrument board provided with a recessed instrument panel, a plurality of perforations in the face of said panel to receive the instruments, said instrument board together with said instrument panel, formed from a single sheet of metal.

3. The combination with an automobile instrument board of an instrument recess and a supplementary glass mounting recess all formed from a single metal sheet.

4. The combination with a one piece automobile instrument board having a recessed instrument panel and a supplementary glass mounting recess formed therein, of a plurality of one piece instrument clamping rings attached thereto and provided with means to push the instrument against the board.

5. In combination with an instrument board, a one piece instrument clamping ring secured thereto and provided with instrument wedging lips for automobile instrument mounting.

6. The combination of one piece instrument clamping rings provided with wedging lips and a sheet metal instrument panel together with means for joining the said rings in permanent relation to the said panel so that the wedging lips will push the instrument against the rear of the panel when the rings are clamped upon the instrument.

7. The combination with a one piece automobile instrument board having an integral recessed instrument panel provided with a plurality of instrument openings, of clamping rings provided with wedging lips adapted to secure instruments to the said panel but to allow of their individual removal and adjustment.

8. The combination with a one piece automobile instrument board recessed to provide a glass covered instrument panel, of a retaining ring adapted to engage the outer portion of said recess to retain a cover glass.

9. The combination with a one piece automobile instrument board having an instrument recess and a supplementary recess peripheric to the said instrument recess, of a glass retaining ring adapted to enter said supplementary recess, to retain a glass cover in place over said instrument.

10. The combination with a one piece automobile instrument board recessed to provide a glass covered instrument panel, of a glass retaining ring adapted to engage the outer portion of said recess to retain a cover glass and one piece instrument clamping rings secured to the rear of said recessed portion to hold instruments thereon.

11. In a new article of manufacture a one piece automobile instrument board recessed to provide an instrument panel and a glass retaining ring adapted to enter the outer portion of said recess and to be retained therein by means operating from the rear of said instrument board to hold a cover glass over said panel and the faces of the instruments mounted.

12. In a new article of manufacture a one piece automobile instrument board recessed to provide an instrument panel, openings in said panel to disclose the face of instruments mounted on the rear thereof and clamping means provided with wedging lips adapted to hold said instruments in registry with said openings and to push the instruments against the rear of the panel.

13. A new article of manufacture comprising an automobile instrument board formed of sheet metal having a recessed instrument panel, a plurality of perforations in the face of said panel, each adapted to accommodate an instrument, means adjacent the perforations for detachably securing the instruments in place, a transparent covering for said instrument panel adapted to protect the face of said instrument and being spaced therefrom and means for securing said transparent covering in operative position.

In testimony whereof I have affixed my signature to this specification.

WILLIAM P. HAMMOND.